United States Patent [19]

Miyasaka et al.

[11] Patent Number: 4,557,512
[45] Date of Patent: Dec. 10, 1985

[54] STRIKER ATTACHMENT CONSTRUCTION

[75] Inventors: Masashi Miyasaka, Isehara; Akio Oikawa, Atsugi, both of Japan

[73] Assignee: Nissan Motor Co., Ltd., Yokohama, Japan

[21] Appl. No.: 592,021

[22] Filed: Mar. 22, 1984

[30] Foreign Application Priority Data

May 20, 1983 [JP] Japan ............................ 58-74652[U]

[51] Int. Cl.⁴ ............................................ E05C 19/02
[52] U.S. Cl. ...................... 292/341.18; 292/DIG. 38; 292/DIG. 60
[58] Field of Search ...................... 292/341.18, 341.19, 292/17, DIG. 38, DIG. 60; 296/70, 73

[56] References Cited

U.S. PATENT DOCUMENTS

| | | | |
|---|---|---|---|
| 2,042,024 | 5/1936 | Schlage | 292/341.18 |
| 2,439,036 | 4/1948 | Bohnsack | 292/341.18 |
| 2,577,507 | 12/1951 | Bergdorf | 292/17 |
| 2,713,506 | 7/1955 | Wickstrom | 292/341.18 |
| 3,734,551 | 5/1973 | Hughes et al. | 292/341.18 X |
| 4,453,752 | 6/1984 | McKann | 292/341.19 |

FOREIGN PATENT DOCUMENTS

| | | | |
|---|---|---|---|
| 52-27015 | 2/1977 | Japan . | |
| 52-30572 | 3/1977 | Japan . | |
| 701919 | 1/1954 | United Kingdom | 292/341.18 |

Primary Examiner—Richard E. Moore
Attorney, Agent, or Firm—Leydig, Voit & Mayer

[57] ABSTRACT

A striker is temporarily fixed to a member by inserting its one end into a slit formed in the member. The other end portion is securely fixed to the member by means of a screw which extends through an elongate slot formed in the other end. An adjustment of the striker can be carried out easily by removing an adjustment portion formed integral with the member around the slit or an adjustment portion formed integral with the striker on a wall adapted to be engaged by the edge of the slit defining wall of the member.

4 Claims, 5 Drawing Figures

STRIKER ATTACHMENT CONSTRUCTION

BACKGROUND OF THE INVENTION

1. Field of the Invention

The present invention relates a striker attachment construction and more particularly to a striker attachment construction suitable for a striker used in a lock for a container box provided in an automotive vehicle in particular, such as a glove box in the case of an instrument panel or a console box in the case of a console or a container box in the case of a door trim.

2. Description of the Prior Art

According to Laid-open Japanese Utility Model Application No. 52-27015, a striker is fixedly attached to a designated member by means of two screws via screw receiving holes formed in the striker. The screw receiving holes are elongate so as to permit a limited movement of the striker for adjustment if necessary. In attaching the striker, a worker has to use his one hand to set the striker in position while using his other hand in manipulating a tool for tightening the screws. Besides he has to adjust the position of the striker under this condition. Therefore, the work is complicated and cannot be automated since the striker can not be temporarily fixed.

SUMMARY OF THE INVENTION

According to the present invention, a striker has one end portion inserted into a slit formed in a shoulder of a member and an opposite end portion fixed to the member by a screw extending through a screw receiving hole formed in the opposite end portion. The screw receiving hole is elongate to permit limited movement of the striker. Either the striker or the member is formed with a portion which when removed allows the striker to move relative to the member at least in one direction.

Accordingly, an object of the present invention is to provide a striker attachment construction wherein the work is less complicated and can be automated and besides the work for adjustment of the position of the striker is accurate and simple.

DETAILED DESCRIPTION OF THE INVENTION

Figure 1:
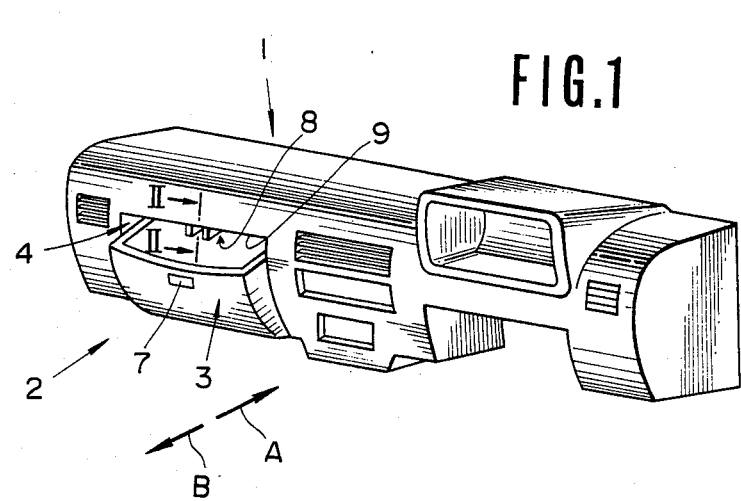
FIG. 1 is a perspective view of an instrument panel of an automotive vehicle.

Referring to FIG. 1, the reference numeral 1 denotes an instrument panel, and the reference numeral 2 a glove box. The glove box 2 includes a container 3 serving also as a lid. The container 3 is hingedly mounted within a box housing 4, formed in the instrument panel 1, with a hinge 5. The container 3 is provided with a lock device 7 which is adapted to be engaged with a striker 8 attached to and projecting perpendicularly outwardly relative to the under surface of the upper wall 9 of the box housing 4.

Figure 2:
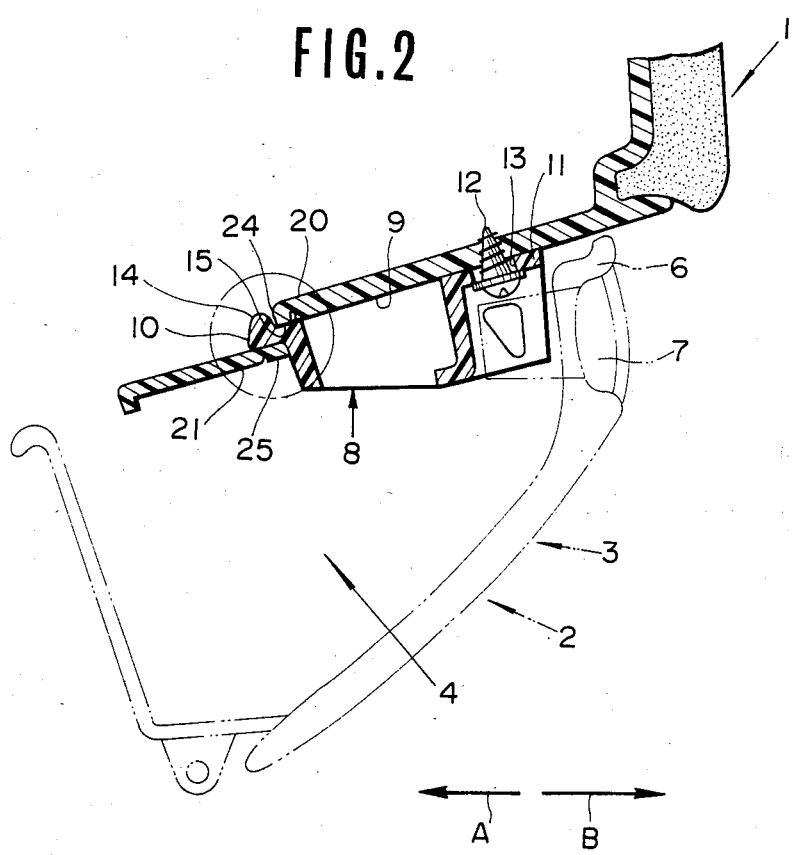
FIG. 2 is an enlarged sectional view through line II—II in FIG. 1 showing a first embodiment of a striker attachment construction according to the present invention.
Figure 3:
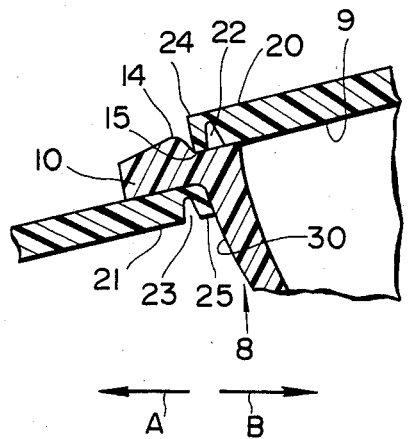
FIG. 3 is an enlarged sectional view of a portion encircled by a phantom line drawn circle in FIG. 2.

Referring to FIGS. 2 and 3, the striker 8 has one end portion 10 formed with a protruding portion 14. The box housing upper wall 9 has a shoulder formed with a slit 15 receiving the one end portion 10. The striker 8 can be temporarily fixed to the box housing upper wall 9 only by inserting the one end portion 10 into the slit 15 until the protruding portion 14 is engaged by the slit defining walls. On the opposite end portion 11 of the striker 8 is formed a screw receiving hole 13 receiving a screw 12. The hole 13 is elongate to permit limited movement of the striker 8 for adjustment in the direction indicated by the arrow A or B in the drawings. Such movement, however, is restrained because a front end wall 30 is engaged by a portion 25 and the protruding portion 14 is engaged by a portion 24 as best seen in FIG. 3. The portion 24 and 25 are integral parts of upper and lower slit defining edge portions 20 and 21, respectively, but easily removable from the remaining portions owing to the provision of notches 22 and 23. Therefore, when the portion 24 is removed, the striker 8 can be moved in a direction as indicated by an arrow B, whereas, when the portion 25 is removed, the striker 8 can be moved in the opposite direction indicated by an arrow A.

Hereinafter, the work necessary for attachment of the striker 8 is described.

First, the end portion 10 formed with the protruding portion 14 is inserted into the slit 15 to temporarily fix the striker 8 to the box housing upper wall 9. When passing through the slit 15, the slit 15 is slightly enlarged and/or the protruding portion 14 is slightly deformed. Next, the screw 12 is inserted into the elongate screw receiving hole 13 and then threadedly engaged with the box housing upper wall 9 until the end portion 11 is fixed to the upper wall 9. If the striker 8 is to be adjusted, the appropriate one of the portions 24 and 25 is removed. The movement of the striker 8 for adjustment is allowed due to the fact that the hole 13 receiving the screw 12 is elongate.

Figure 5:
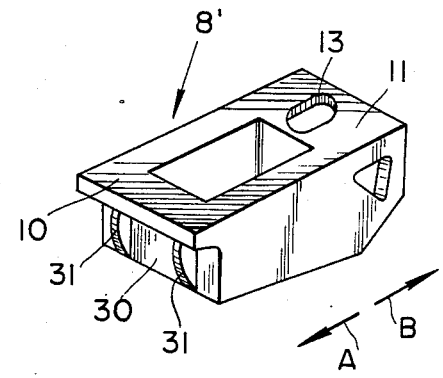
FIG. 5 is a perspective view of a striker used in the second embodiment.
Figure 4:
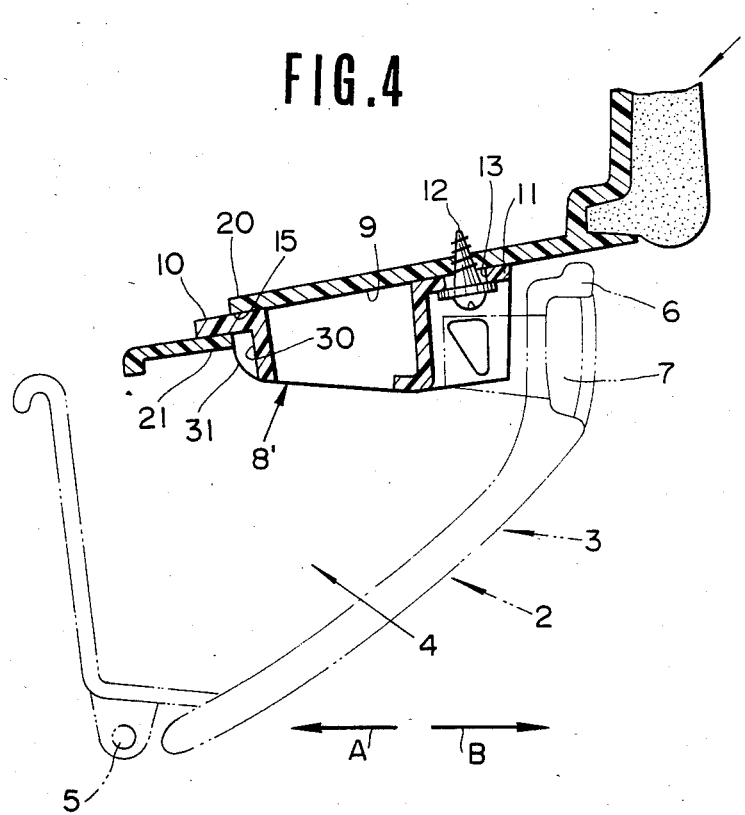
FIG. 4 is a similar view to FIG. 2 illustrating a second embodiment according to the present invention.

Referring to FIGS. 4 and 5, a second embodiment according to the present invention is described. This embodiment is substantially the same as the first embodiment but different from the latter in that the upper and lower slit defining edge portions 20 and 21 are not formed with the easily removable portions 24 and 25 which were necessary in the first embodiment. Another difference is in that a striker 8' used in the second embodiment has one end portion 10 which is not formed with the protruding portion 14. Thus, the end portion 10 of the striker 8' has substantially parallel upper and lower walls. The striker 8' is formed on a front wall 30 with an adjustment portion in the form of a pair of projections 31. The projections 31 are engaged by the edge of the lower slit defining wall 21 as shown in FIG. 4. If the striker 8' is to be adjusted in a direction as indicated by an arrow A, the projections 31 are removed. Adjusting the striker 8' in the opposite direction as indicated by an arrow B can be carried out freely because the end portion 10 of the striker 8' is not formed with the protruding portion 14. The pair of projections 31 used in the second embodiment are so designed as to be easily removable.

It will now be understood that the work has been simplified since the striker 8 or 8' is temporarily fixed. It will also be understood that the work can be automated since the step for tightening the screw 2 is independent from the step of temporarily fixing the striker. Lastly, it will be understood that the adjustment of the striker has been simplified owing to the use of easily removable adjustment portions 24, 25 or 31.

What is claimed is:

1. A striker attachment construction, comprising:
    a member having a shoulder formed with a slit and having slit defining walls defining two parallel sides of said slit;
    a striker having one end portion inserted into said slit and an opposite end portion formed with an elongate screw receiving hole; and
    a screw extending through said screw receiving hole and threadedly engaged with said member to mount said striker in position on said member;
    means integral with and easily removable from one of said member and said striker, said means blocking movement of said striker relative to said member in at least one direction parallel to the direction of elongation of the hole when not removed and allowing such relative movement when removed for adjustment of the mounted position of said striker.

2. A striker attachment construction as claimed in claim 1, wherein said means is in the form of an integral portion of at least one of the slit defining walls of said member which is defined by a notch in said member.

3. A striker attachment construction as claimed in claim 1, wherein said means is in the form of at least one projection formed on said striker.

4. A striker attachment as claimed in claim 1 wherein said member has a mounting surface and said striker is mounted to project perpendicularly outwardly relative to the mounting surface.

* * * * *